United States Patent Office 3,345,143
Patented Oct. 3, 1967

3,345,143
PRODUCTION OF STOICHIOMETRIC URANIUM MONOCARBIDE FROM A URANIUM FLUORIDE
Earl W. Murbach, Thousand Oaks, Calif., assignor, by mesne assignments, to the United States of America as represented by the United States Atomic Energy Commission
No Drawing. Filed Oct. 2, 1964, Ser. No. 401,214
7 Claims. (Cl. 23—349)

The present invention relates to a method for the production of uranium monocarbide, and more particularly to a method of producing stoichiometric uranium monocarbide directly from a uranium fluoride compound with minimum amounts of trace impurities.

Uranium monocarbide is acquiring increasing importance as a nuclear reactor fuel. It is capable of reaching higher fuel burnups than uranium metal without appreciable distortion, as are other ceramic uranium compounds, such as $UO_2$. Its thermal conductivity, however, is superior to other ceramic compositions, and approaches that of the metal. The combination of high burnup, dimensional stability, and good thermal conductivity make uranium monocarbide an ideal fuel for high-temperature, high-performance nuclear reactors such as sodium-cooled reactors.

For an economical fuel cycle utilizing uranium monocarbide, it is important that the cost of each step in the process for fabricating fuel elements be reduced to a minimum. Uranium monocarbide is now customarily produced by converting a uranium fluoride such as $UF_4$ or $UF_6$ (enriched uranium is obtained from the gaseous diffusion process as the fluoride) through the intermediate steps of $UO_2$ or uranium metal, which is followed by heating with carbon. The resulting UC is then arc-melted and cast into fuel slugs. Elimination of unnecessary intermediate steps would of course improve process economics.

Another requirement in the production of uranium monocarbide fuel element material is that it be either stoichiometric (4.80 weight percent carbon) or slightly hypostoichiometric. These requirement has arisen as a result of fuel element cladding failures from carburization. Uranium monocarbide fuel elements are customarily contained in a stainless steel jacket with a liquid metal disposed in an annulus between the fuel and the cladding to serve as a heat transfer agent. It is found that in hyperstoichiometric UC, where there is free carbon in the UC matrix, the carbon migrates through the sodium bond to the stainless steel jacket, carburizing and thereby structurally weakening the stainless steel. Accordingly, UC fuel should be either stoichiometric or slightly hypostoichiometric to prevent such potentially serious fuel element failure.

A further requirement of a satisfactory process for the production of uranium monocarbide is that the impurity content in the UC be held to a satisfactory minimum level, in order to avoid introduction of high neutron cross section materials or metallurgically undesirable elements. In particular, the fluorine content of UC produced from $UF_4$ must be held to trace levels.

An object of the present invention, therefore, is to provide a method for the production of uranium monocarbide.

Another object is to provide a method for the production of stoichiometric uranium monocarbide directly from a uranium fluoride.

Another object is to provide such a method which is relatively rapid and employs relatively inexpensive chemical reagents.

Still another object is to provide a method for the production of uranium monocarbide directly from a uranium fluoride having a very low impurity content.

Other objects and advantages of the present invention will become apparent from the following detailed description and the appended claims.

In accordance with the present invention, uranium monocarbide may be produced by contacting a uranium fluoride with silicon dioxide and carbon at a temperature of at least about 400° C. under inert conditions until the resulting $SiF_4$ gas is removed, and then increasing the temperature to at least about 1300° C. until the reaction is completed. The product is a partially sintered mass of black uranium monocarbide of low impurity level. This powder is suitable for subsequent arc-melting to produce a dense fuel body.

It is believed that the present conversion process proceeds in two steps. In the first, the uranium fluoride is reduced by the silica, according to the following balanced equation:

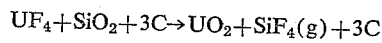

In the second step, at the higher temperature, the $UO_2$ reacts with the carbon to produce UC according to the following reaction:

In the first reaction the $SiO_2$ functions effectively in several ways. The reaction with the $UF_4$ is rapid and complete to produce $SiF_4$ gas, since the reaction has a negative free energy. In contrast, a postulated similar reaction substituting silicon metal for $SiO_2$ would not be feasible at these temperatures due to a positive free energy. Of further importance from an economic standpoint, the silica is very much less expensive than pure silicon, by a factor of about 100. Removing the fluorine at this point as $SiF_4$ further achieves virtually complete removal of the fluorine and silicon, which are then not present during the subsequent conversion of $UO_2$ to UC. It is necessary to keep the impurity concentration in the UC fuel to a minimum, particularly since light elements such as fluorine undergo various undesirable nuclear reactions.

The two steps of the present process are sequentially performed in the same apparatus; thus, after all the $SiF_4$ fumes are removed from a furnace, thereby indicating completion of the reaction, the temperature is raised to effect conversion of the $UO_2$ to UC. In the first step of the process, weighed quantities of $UF_4$, $SiO_2$, and C, generally in the ratio of 1 mol $UF_4$ to 1 mol $SiO_2$ to 3 mols C, are thoroughly mixed and placed in a crucible inside a furnace. It is noted that the concentration of carbon may be adjusted over the foregoing theoretical concentration for production of stoichiometric uranium monocarbide to compensate for certain factors which will alter the final UC composition. For example, carbon may be picked up from a graphite crucible or an electrode, thereby increasing the carbon concentration of the UC to hyperstoichiometric. By empirically adjusting the carbon concentration to account for such carbon pickup, the resulting UC will be precisely or very close to stoichiometric. Similarly, additional uranium can be added to a charge for the arc-melting and casting of the final fuel slug, thereby compensating for a slightly hyperstoichiometric UC feed powder.

The crucible charge is heated under inert conditions for a period of about 1–4 hours at a temperature of at least 400° C.; the reaction becomes rapid at 600° C. A temperature range of about 400–700° C., is thus very satisfactory. While the heating may be performed under either vacuum or an inert gas atmosphere (helium or argon, for instance) it is preferable to use the rare gas to prevent splattering of the energetically reacting crucible charge. In a preferred form of the invention, thoroughly mixed powders of $UF_4 + SiO_2 + C$ in a 1:1:3 mol ratio are heated for about two hours at a temperature of about 600° C. in argon at a slight negative pressure (for example −10″ Hg).

The evolved $SiF_4$ gases are removed from the reaction vessel until there is no further evolution of fumes, and the temperature is then slowly increased until a temperature of at least about 1300° C. is reached, at which temperature a second reaction is initiated. A temperature range of about 1300–1700° C. is highly suitable. The $UO_2$ is converted to stoichiometric UC and the heating is continued until gas evolution (CO) ceases. While the heating in the second step of the process may also be conducted under an inert gas atmosphere, it is preferred to utilize a vacuum, since the refractory $UO_2$ will not spatter. The reaction is generally completed in a period of about 1–5 hours. In a preferred form of the invention, the heating in the second step of the process is conducted under vacuum at a temperature of about 1700° C. for about 4 hours. The product obtained in this manner is a partially sintered mass of black material which then may be arc-melted and cast into UC fuel elements.

The following examples are offered to illustrate the present invention in greater detail.

EXAMPLES $UF_4$, $SiO_2$ and carbon were thoroughly mixed by ball-milling in the mol ratio 1:1:3. The mixture was placed in a graphite crucible in a furnace, the furnace evacuated and argon admitted to the furnace to approximately one-half atmosphere. The mixture was heated and a reaction initiated at about 400° C. which became rapid at about 600° C. The $SiF_4$ fumes were removed, and the reaction completed in approximately two hours.

The furnace was then evacuated and heated to 1300° C. at which temperature a second reaction was initiated. The temperature was gradually raised to 1700° C. over four hours to complete the second reaction. The product was a sintered mass of UC. Combustion analysis showed that the UC product contained 5.16% carbon and 94.84% uranium. Silicon and fluorine could not be detected in the analysis, which indicated that each was present in a concentration of less than 0.01%. The slightly high carbon concentration in the UC was attributed to carbon pickup from the graphite crucible.

In another run carried out as above, the preparation was analyzed specifically for fluorine after the first reaction step. The fluorine content was 60 parts per million. In another run the preparation was analyzed for silicon after arc-melting the reaction product; it contained 50 parts per million silicon.

The above examples are illustrative rather than restrictive of the present invention which should be understood to be limited only as is indicated in the appended claims.

Having thus described my invention I claim:

1. A method of producing uranium monocarbide directly from a uranium fluoride, which comprises contacting the uranium fluoride, silicon dioxide, and carbon at a temperature of at least about 400° C. under an inert environment until evolution of the resulting $SiF_4$ gas is complete, and then increasing the temperature to at least about 1300° C. until the reaction is completed.

2. A method of producing uranium monocarbide from uranium tetrafluoride, which comprises firstly contacting uranium tetrafluoride, silicon dioxide, and carbon at a temperature of about 400–700° C. under inert conditions until the evolution of $SiF_4$ gas is complete and said $SiF_4$ removed, and then secondly increasing the temperature under said inert conditions to about 1300–1800° C. until uranium monocarbide is completely obtained.

3. The method of claim 2 wherein the first reaction is conducted for a period of about 1–4 hours, and the second reaction is conducted for a period of about 1–5 hours.

4. The method of claim 2 wherein the inert environment in the first reaction is an inert gas, and the inert environment in the second reaction is a vacuum.

5. The method of claim 2 wherein the $UF_4$, $SiO_2$, and carbon are in a mol ratio of about 1:1:3.

6. A method of directly converting $UF_4$ to stoichiometric UC which comprises mixing $UF_4$, $SiO_2$, and carbon in a mol ratio of about 1:1:3, heating said mixture under an inert gas for about 1–4 hours at a temperature of about 400–700° C., removing the evolved $SiF_4$ gases, and then increasing the temperature under a vacuum to about 1300–1800° C. for about 1–5 hours until the UC product is obtained.

7. A method of forming stoichometric UC from $UF_4$, which comprises thoroughly mixing $UF_4$, $SiO_2$, and carbon powders in a mol ratio of about 1:1:3, heating the resulting mixture under a rare gas atmosphere for about 2 hours at a temperature of about 600° C. until the resulting evolution of $SiF_4$ gas ceases and said $SiF_4$ is removed, then increasing the temperature to about 1700° C. for about 4 hours under a vacuum to complete the formation of uranium monocarbide.

References Cited

UNITED STATES PATENTS 3,046,090   7/1962   Powers _____ 23—349

CARL D. QUARFORTH, Primary Examiner.

L. DEWAYNE RUTLEDGE, Examiner.

S. TRAUB, R. L. GRUDZIECKI, Assistant Examiners.